United States Patent
Tahk et al.

(10) Patent No.: US 9,703,939 B2
(45) Date of Patent: Jul. 11, 2017

(54) MOBILE TERMINAL AND CONTROL METHOD THEREOF

(71) Applicant: LG ELECTRONICS INC., Seoul (KR)

(72) Inventors: Uisoo Tahk, Goyang (KR); Minhun Ha, Goyang (KR); Uijun Kim, Seongnam (KR); Jaeyee Lee, Seoul (KR); Sanghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 594 days.

(21) Appl. No.: 13/900,428

(22) Filed: May 22, 2013

(65) Prior Publication Data

US 2014/0028823 A1    Jan. 30, 2014

(30) Foreign Application Priority Data

Jul. 11, 2012 (KR) .................. 10-2012-0075734

(51) Int. Cl.
*G06F 21/32* (2013.01)
*G06F 21/36* (2013.01)
(Continued)

(52) U.S. Cl.
CPC .............. *G06F 21/32* (2013.01); *G06F 21/36* (2013.01); *G06K 9/00228* (2013.01);
(Continued)

(58) Field of Classification Search
CPC ..................................... G06F 21/32
See application file for complete search history.

(56) References Cited

U.S. PATENT DOCUMENTS 8,836,530 B1 * 9/2014 Bowers .................. G06F 21/32
340/517
8,860,795 B2 * 10/2014 Suzuki ............... G06K 9/00221
348/77

(Continued)

FOREIGN PATENT DOCUMENTS

CN       2034097       3/1989
EP       1703440 A2    9/2006
(Continued)

OTHER PUBLICATIONS

European Patent Office Application Serial No. 13001825.2, Search Report dated Jul. 22, 2013, 14 pages.

(Continued)

*Primary Examiner* — Christopher Findley
(74) *Attorney, Agent, or Firm* — Lee, Hong, Degerman, Kang & Waimey

(57) ABSTRACT

A mobile terminal having a face recognition function and a control method thereof are provided. A mobile terminal includes a display unit, a memory, a photographing unit and a controller. The memory stores first photographing distance information mapped to a plurality of coordinates in a previously obtained first face image, as reference information for releasing a lock mode in which a touch input applied to the display unit is restricted. The photographing unit obtains a second face image by photographing a subject, when a face recognition function is performed in the lock mode. The controller computes second photographing distance information mapped to the plurality of coordinates in the second face image, and releases the lock mode, based on a result obtained by comparing the first photographing distance information and the second photographing distance information.

17 Claims, 12 Drawing Sheets

(51) Int. Cl.
*G06K 9/00* (2006.01)
*H04N 1/00* (2006.01)
*H04N 1/21* (2006.01)
*H04N 1/44* (2006.01)
*H04N 5/232* (2006.01)
*H04N 101/00* (2006.01)

(52) U.S. Cl.
CPC ..... *H04N 1/00307* (2013.01); *H04N 1/00411* (2013.01); *H04N 1/00456* (2013.01); *H04N 1/2112* (2013.01); *H04N 1/442* (2013.01); *H04N 1/4433* (2013.01); *H04N 5/23293* (2013.01); *H04N 2101/00* (2013.01); *H04N 2201/0084* (2013.01); *H04N 2201/0096* (2013.01); *H04N 2201/0098* (2013.01)

(56) References Cited

U.S. PATENT DOCUMENTS

| | | | |
|---|---|---|---|
| 9,082,235 B2* | 7/2015 | Lau | G07C 9/00 |
| 2004/0062423 A1 | 4/2004 | Doi | |
| 2004/0218070 A1 | 11/2004 | Hamalainen | |
| 2006/0093183 A1 | 5/2006 | Hosoi | |
| 2007/0002157 A1 | 1/2007 | Shintani et al. | |
| 2008/0001703 A1 | 1/2008 | Goto | |
| 2009/0060293 A1 | 3/2009 | Nagao et al. | |
| 2009/0083847 A1 | 3/2009 | Fadell et al. | |
| 2010/0272328 A1* | 10/2010 | Lee | G06K 9/00255 382/118 |
| 2013/0010095 A1 | 1/2013 | Aoki et al. | |
| 2013/0102273 A1 | 4/2013 | Jung et al. | |

FOREIGN PATENT DOCUMENTS

| | | |
|---|---|---|
| JP | 2010160595 A | 7/2010 |
| WO | 2011121688 A1 | 10/2011 |

OTHER PUBLICATIONS

European Patent Office Application No. 13001825.2, Search Report dated Mar. 23, 2016, 10 pages.

The State Intellectual Property Office of the People's Republic of China Application No. 201310214127.9, Office Action dated Nov. 14, 2016, 12 pages.

* cited by examiner

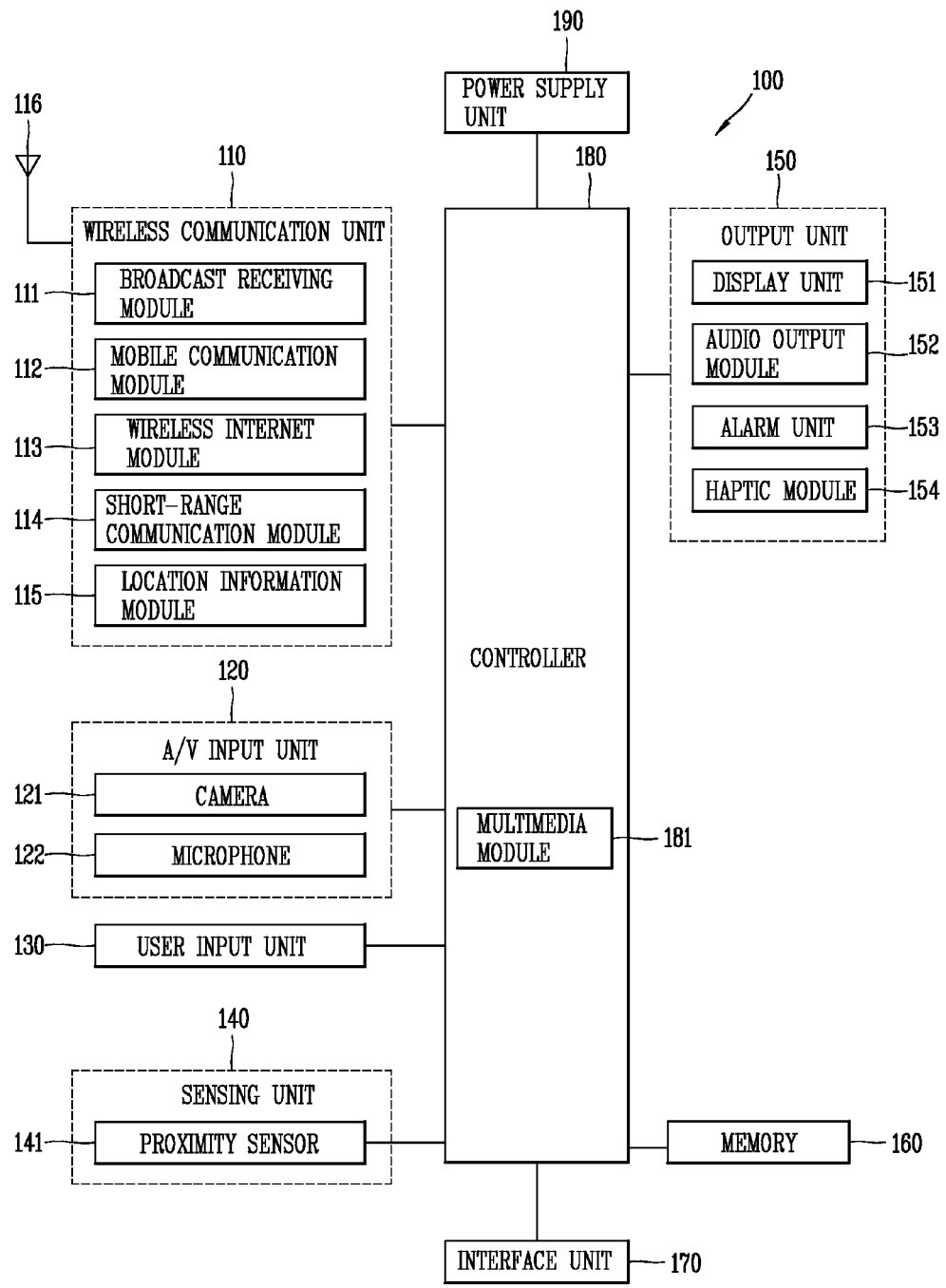

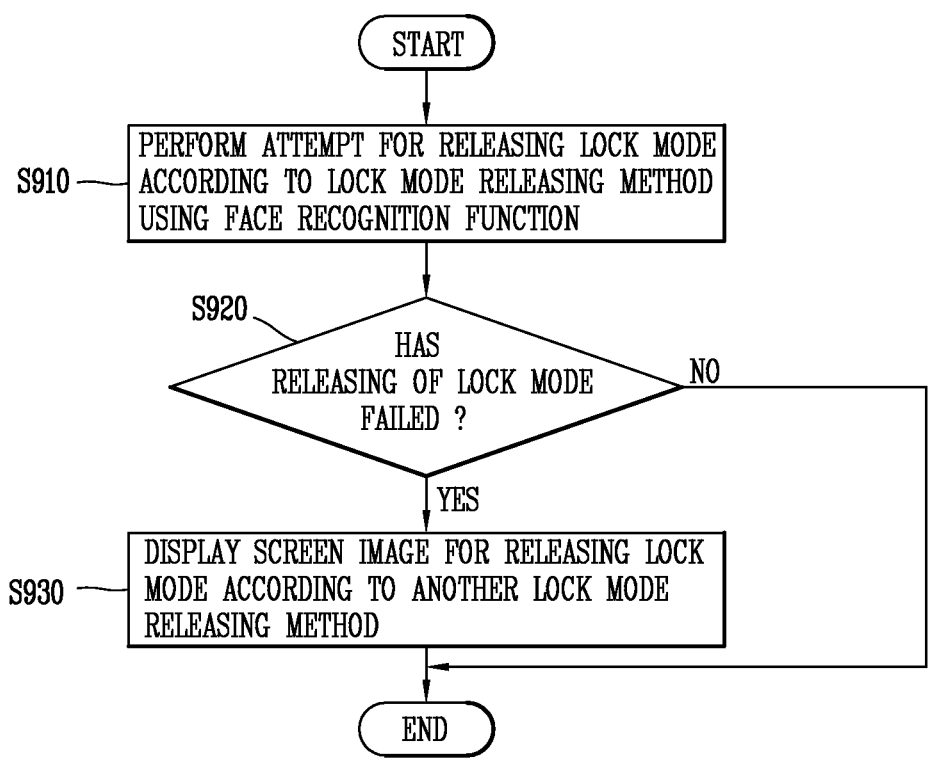

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Application No. 10-2012-0075734, filed on Jul. 11, 2012, the contents of which are all hereby incorporated by reference herein in its entirety.

BACKGROUND OF THE INVENTION

1. Field of the Invention

The present invention relates to a mobile terminal, and particularly, to a mobile terminal having a face recognition function and a control method thereof.

2. Description of the Conventional Art

Terminals can be divided into mobile/portable terminals and stationary terminals according to their mobility. The portable terminals can be divided into handheld terminals and vehicle mount terminals according to whether a user directly carries his or her terminal.

As such a mobile terminal becomes multifunctional, the mobile terminal can be allowed to capture still images or moving images, play music or video files, play games, receive broadcast, etc., so as to be implemented as an integrated multimedia player. In order to support and enhance such functions of the terminal, it can be considered to improve configuration and/or software of the terminal.

For example, the mobile terminal can be implemented to obtain by photographing a subject through a camera and to perform a user authentication by applying a face recognition function to the face image. However, the user authentication may be succeeded even when a person's face is not actually photographed, but a face image is obtained from a stolen photograph. In other words, although there is no authority to use the mobile terminal, the user authentication may be succeeded. Therefore, a security problem may be caused.

SUMMARY OF THE INVENTION

Therefore, an aspect of the invention is to provide a mobile terminal and a control method thereof, which can reinforce security when a lock mode is released using a face recognition function.

To achieve these and other advantages and in accordance with the purpose of this specification, as embodied and broadly described herein, a mobile terminal includes a display unit; a memory configured to store first photographing distance information mapped to a plurality of coordinates in a previously obtained first face image, as reference information for releasing a lock mode in which a touch input applied to the display unit is restricted; a photographing unit configured to obtain a second face image by photographing a subject, when a face recognition function is performed in the lock mode; and a controller configured to compute second photographing distance information mapped to the plurality of coordinates in the second face image, and release the lock mode, based on a result obtained by comparing the first photographing distance information and the second photographing distance information.

In one exemplary embodiment, the controller may control the display unit to display a preview image for the second face image when the subject is photographed in the lock mode. The controller may enlarge or reduce the preview image, based on the difference between a representative photographing distance of the first face image and a representative photographing distance of the preview image. When the face size of the preview image corresponds to that of the first face image, the controller may control the photographing unit to obtain the second face image by capturing the preview image. The controller may control the display unit to display guidance information for adjusting the face size of the preview image, corresponding to that of the first face image.

In one exemplary embodiment, if the degree of coincidence between the first photographing distance information and the second photographing distance information is a reference value or more, the controller may release the lock mode.

In one exemplary embodiment, the controller may extract first and second face portions corresponding to each other from the first and second face images, and release the lock mode, based on a result obtained by comparing a photographing distance mapped to the coordinate of the first face portion and a photographing distance mapped to the coordinate of the second face portion.

In one exemplary embodiment, if the releasing of the lock mode according to one lock mode releasing method using the face recognition function fails, the controller may control the display unit to display a screen image for releasing the lock mode according to another lock mode releasing method.

In one exemplary embodiment, the mobile terminal may further include an illumination sensor configured to sense external brightness; and a proximity sensor configured to sense the presence of proximity of an external object. In the mobile terminal, the controller may determine whether to perform the face recognition function, based on at least one of the external brightness and the presence of proximity of the external object.

In one exemplary embodiment, the controller may perform the face recognition function in response to a touch input for a push message displayed in the lock mode. If the lock mode is released according to the lock mode releasing method using the face recognition function, the controller may control the display unit to display an execution screen image of an application for managing the push message.

In one exemplary embodiment, the photographing unit may include a camera array having a plurality of lenses, and the camera array may be configured to recognize a plurality of photographing distances respectively corresponding to the plurality of coordinates.

In one exemplary embodiment, each of the first and second face images may include at least one of front and side images.

In one exemplary embodiment, if any one of the front and side images is obtained, the controller may control the photographing unit to obtain the other of the front and side images by photographing a face surface different from that corresponding to the one image. If any one of the front and side images is obtained, the controller may predict the other of the front and side images from the one image. If any one of the front and side images is obtained, the controller may control the display unit to display guidance information for photographing a face surface different from that corresponding to the one image.

To achieve these and other advantages and in accordance with the purpose of this specification, as embodied and broadly described herein, a control method of a mobile terminal includes storing first photographing distance information mapped to a plurality of coordinates in a previously obtained first face image, as reference information for releasing a lock mode in which a touch input is restricted; obtaining a second face image by photographing a subject, when a face recognition function is performed in the lock mode; computing second photographing distance information mapped to the plurality of coordinates in the second face image; and releasing the lock mode, based on a result obtained by comparing the first photographing distance information and the second photographing distance information.

In one exemplary embodiment, the obtaining of the second face image may include displaying a preview image for the second face image. The obtaining of the second face image may further include enlarging or reducing the preview image, based on the difference between a representative photographing distance of the first face image and a representative photographing distance of the preview image. The obtaining of the second face image may further include capturing the preview image, when the face size of the preview image corresponds to that of the first face image. The obtaining of the second face image may further include displaying guidance information for adjusting the face size of the preview image, corresponding to that of the first face image.

In one exemplary embodiment, the releasing of the lock mode may include releasing the lock mode, if the degree of coincidence between the first photographing distance information and the second photographing distance information is a reference value or more. The releasing of the lock mode may include extracting first and second face portions corresponding to each other from the first and second face images, and releasing the lock mode, based on a result obtained by comparing a photographing distance mapped to the coordinate of the first face portion and a photographing distance mapped to the coordinate of the second face portion.

In one exemplary embodiment, the control method may further include displaying a screen image for releasing the lock mode according to another lock mode releasing method, if the releasing of the lock mode according to one lock mode releasing method using the face recognition function fails.

According to the exemplary embodiments, the lock mode can be released, based on photographing distance information that is linked with a face image and reflects the stereoscopic shape of a subject. As a result, a person having no authority to use the mobile terminal steals a photograph of a person having the authority to use the mobile terminal, the lock mode cannot be released using the photograph having no stereoscopic shape. This means that security can be reinforced as compared with the releasing of the lock mode based on only a planar face image.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a block diagram illustrating a mobile terminal related to the present invention;

FIG. 9 is a flowchart illustrating the control method of the mobile terminal, related to the changing of a lock releasing method according to an exemplary embodiment;

DETAILED DESCRIPTION OF EXEMPLARY EMBODIMENTS

Figure 2A:
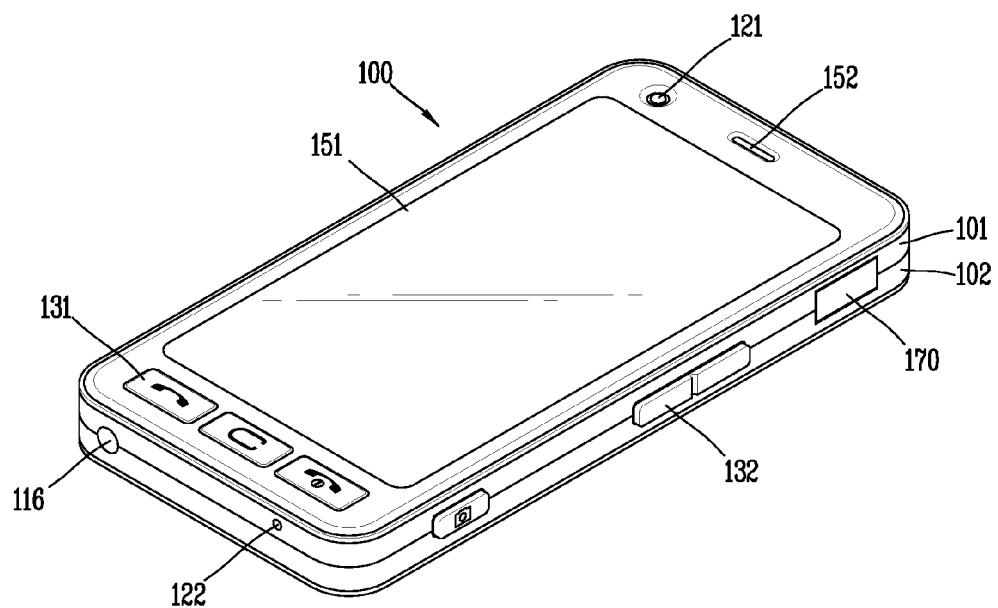
FIGS. 2A and 2B are perspective views illustrating exterior appearances of the mobile terminal related to the present invention.

Hereinafter, the present invention will be explained in more detail with reference to the attached drawings. For the sake of brief description with reference to the drawings, the same or equivalent components will be provided with the same reference numbers, and description thereof will not be repeated. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

A terminal according to the present invention may include a mobile terminal such as a portable phone, a smart phone, a notebook computer, a digital broadcasting terminal, Personal Digital Assistants (PDA), Portable Multimedia Player (PMP), a navigation system, etc. However, it will be obvious to those skilled in the art that the present invention may be also applicable to a fixed terminal such as a digital TV and a desktop computer, except for specific configurations for mobility.

FIG. 1 is a block diagram of a mobile terminal 100 according to an embodiment of the present invention.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components 110~190 will be explained.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151. The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141. And, the sensing unit 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

If the touch sensor and the display unit 151 have a layered structure therebetween, the display unit 151 may be used as an input device rather than an output device. Such display unit 151 may be called a 'touch screen'.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

When the touch screen is implemented as a capacitance type, proximity of a pointer to the touch screen is sensed by changes of an electromagnetic field. In this case, the touch screen (touch sensor) may be categorized into a proximity sensor 141.

The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

In the following description, for the sake of brevity, recognition of the pointer positioned to be close to the touch screen without being contacted will be called a 'proximity touch', while recognition of actual contacting of the pointer on the touch screen will be called a 'contact touch'.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or a capturing mode, the display unit 151 may display a captured and/or received image or a GUI or a UI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The rear surface portion of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of displays may be arranged on one surface integrally or separately, or may be arranged on different surfaces.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. Such video signal or audio signal may be output through the display unit 151 or the audio output module 152. Accordingly, the display unit 151 or the audio output module 152 may be categorized into part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are inputted or outputted. The memory 160 may store therein data on vibrations and sounds of various patterns output when a touch is input onto the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, will be explained a method for processing a user's input to the mobile terminal 100.

The user input unit 130 is manipulated to receive a command for controlling the operation of the mobile terminal 100, and may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as character, number, symbol, graphic, icon or the like. Alternatively, such information may be implemented as a 3D stereoscopic image. For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another. For example, an output window and an input window may be displayed at upper and lower portions of the display unit 151, respectively. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted, or a text output on the output window may be input to an application.

In addition to the input manner illustrated in the embodiments, the display unit 151 or the touch pad may be scrolled to receive a touch input. A user may scroll the display unit 151 or the touch pad to move a cursor or pointer positioned on an object (subject), e.g., an icon or the like, displayed on the display unit 151. In addition, in case of moving a finger on the display unit 151 or the touch pad, the path of the finger being moved may be visibly displayed on the display unit 151, which can be useful upon editing an image displayed on the display unit 151.

One function of the mobile terminal may be executed in correspondence with a case where the display unit 151 (touch screen) and the touch pad are touched together within a preset time. An example of being touched together may include clamping a body with the user's thumb and index fingers. The one function, for example, may be activating or deactivating of the display unit 151 or the touch pad.

Figure 2B:
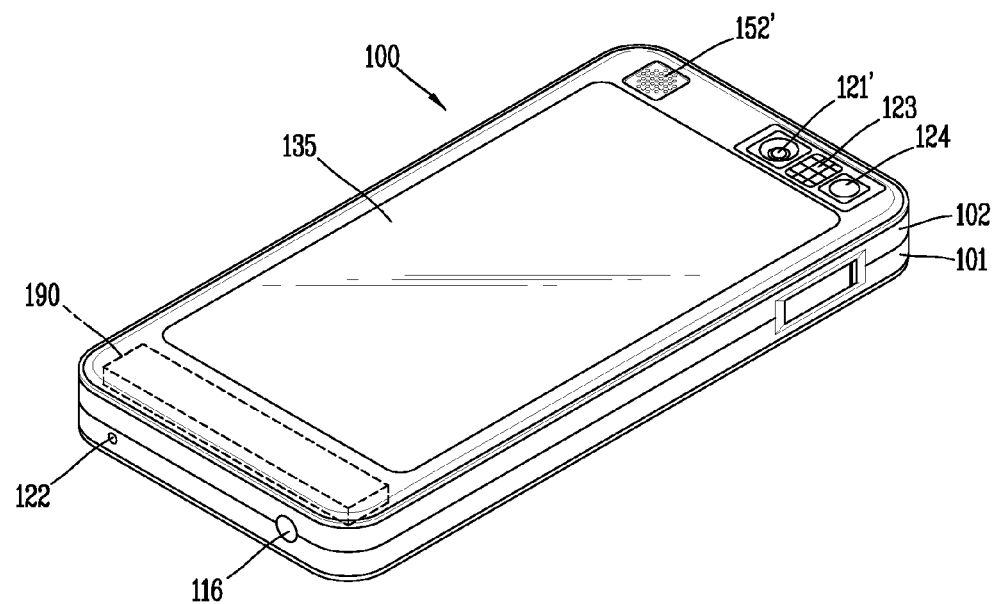

FIGS. 2A and 2B are perspective views showing the appearance of the mobile terminal 100 according to the present invention. FIG. 2A is a view showing a front surface and one side surface of the mobile terminal 100 in accordance with the present invention, and FIG. 2B is a view showing a rear surface and another side surface of the mobile terminal 100 of FIG. 2A.

As shown in FIG. 2A, the mobile terminal 100 is a bar type mobile terminal. However, the present invention is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output module 152, a camera 121, a user input unit 130 (refer to FIG. 1), a microphone 122, an interface unit 170, etc.

The display unit 151 occupies most parts of a main surface of the front case 101. The audio output module 152 and the camera 121 are arranged at a region adjacent to one end of the display unit 151, and the user input unit 131 and the microphone 122 are arranged at a region adjacent to another end of the display unit 151. The user input unit 132, the interface unit 170, etc. may be arranged on side surfaces of the front case 101 and the rear case 102.

The user input unit 130 is manipulated to receive a command for controlling the operation of the mobile terminal 100, and may include a plurality of manipulation units 131 and 132.

The manipulation units 131 and 132 may receive various commands. For instance, the first manipulation 131 is configured to input commands such as START, END, SCROLL or the like, and the second manipulation unit 132 is configured to input commands for controlling a level of sound outputted from the audio output module 152, or commands for converting the current mode of the display unit 151 to a touch recognition mode.

Referring to FIG. 2B, a camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use.

The cameras 121 and 121' may be installed at the terminal body so as to rotate or pop-up.

A flash 123 and a mirror 124 (not shown) may be additionally disposed close to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may be additionally arranged on a rear surface of the terminal body. The audio output module 152' may cooperate with the audio output module 152 (refer to FIG. 2A) disposed on a front surface of the terminal body so as to implement a stereo function. Also, the audio output module 152' may be configured to operate as a speakerphone.

A broadcast signal receiving antenna 116 as well as an antenna for calling may be additionally disposed on a side surface of the terminal body. The broadcast signal receiving antenna 116 of the broadcast receiving module 111 (refer to FIG. 1) may be configured to retract into the terminal body.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151 (refer to FIG. 2A), the touch pad 135 may be formed to be light-transmissive. The touch pad 135 may be also additionally mounted with a rear display unit for outputting visual information. Information output from the display unit 151 (front display) and the rear display can be controlled by the touch pad 135.

The touch pad 135 operates in association with the display unit 151. The touch pad 135 may be disposed on the rear surface of the display unit 151 in parallel. The touch pad 135 may have a size equal to or smaller than that of the display unit 151.

Hereinafter, the releasing of a lock mode using a face recognition function will be described (See FIG. 3). Here, the lock mode refers to an operation state in which a function of the mobile terminal 100 is restrictively performed. For example, a touch input may be restrictively recognized in the lock mode.

Figure 3:
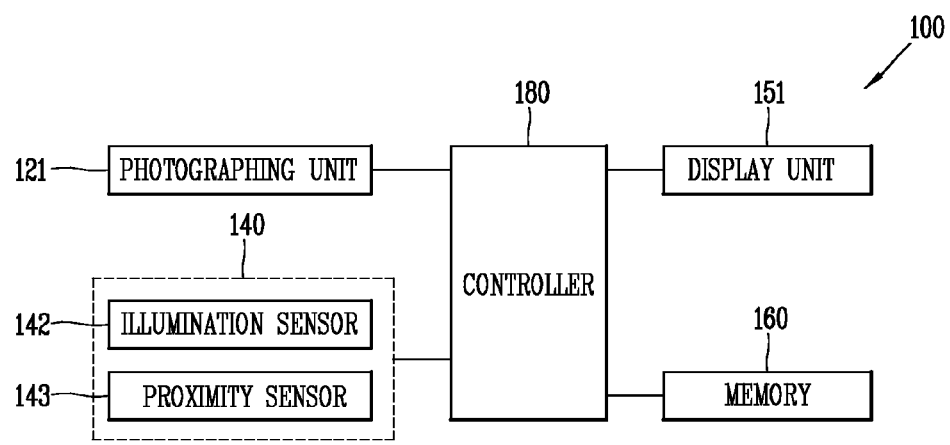
FIG. 3 is a block diagram illustrating a mobile terminal according to an exemplary embodiment.

FIG. 3 is a block diagram illustrating a mobile terminal 200 according to an exemplary embodiment.

Referring to FIG. 3, the mobile terminal 100 according to the exemplary embodiment includes a photographing unit (or camera) 121, a sensing unit 140, a display unit 151, a memory 160 and a controller 180.

The photographing unit 121 obtains an image by photographing a subject. For example, if a face recognition function is performed in a lock mode, the photographing unit 121 may obtain a face image by photographing a person's face. The photographing unit 121 is mounted in a terminal main body of the mobile terminal 100, and may include a camera array having a plurality of lenses. The camera array will be described in detail with reference to FIG. 4.

The sensing unit 140 may include an illumination sensor 142 and a proximity sensor 143, which sense external environment information. The illumination sensor 142 senses external brightness, and the proximity sensor 143 senses whether an external object (e.g., a portion of a person's body, etc.) approaches.

The display unit 151 may display the image obtained in the photographing unit 121. For example, the display unit 151 may display a preview image obtained as the subject is photographed in real time in the lock mode. The display unit 151 may display a screen image for releasing the lock mode in the lock mode.

The memory 160 may store an algorithm for the face recognition function, information related to the image obtained in the lock mode, etc. For example, the memory 160 may store photographing distance information mapped to a plurality of coordinates from the previously obtained face image, as reference information for releasing the lock mode.

Here, the photographing distance information includes a plurality of photographing distances between the photographing unit 121 and a plurality of coordinates arbitrarily defined on a surface of the subject. In a case where the surface of the subject is not flat but irregular, the plurality of photographing distances have different values. The plurality of photographing distances may be distinguished and recognized by the structure of the camera array according to the exemplary embodiment.

The controller 180 controls all operations of the mobile terminal 100. For example, the controller 180 may control operations of releasing the lock mode, photographing an image, recognizing a face, computing photographing distance information, etc. The controller 180 may control the photographing unit 121 to photograph an image obtained by rotating a subject (e.g., a person's face) by an arbitrarily angle (e.g., 30 degrees) in the horizontal direction from the front in the operation of image photographing, face recognition, etc.

Figure 4:
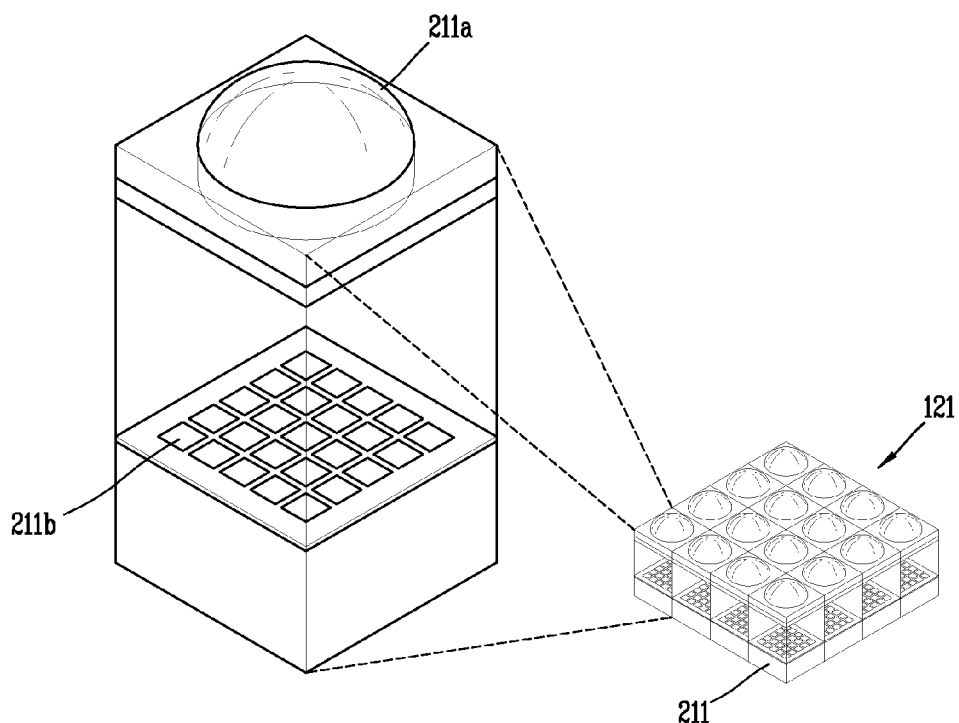
FIG. 4 is a conceptual view illustrating a photographing unit of FIG. 3.

FIG. 4 is a conceptual view illustrating the photographing unit 121 of FIG. 3.

Referring to FIG. 4, the photographing unit 121 includes a camera array having a plurality of lenses. More specifically, the camera array may be implemented with a plurality of camera modules 211 arranged in a matrix form (e.g., N×N, in which N is an integer). Each camera module 211 may have a lens 211a and a pixel sensor 212b.

A subject may be photographed at a plurality of different times by the camera array. Thus, the photographing distance information described above can be computed by combining a plurality of subject information obtained as the subject is photographed at the plurality of times. Further, the camera array can obtain more precise subject information, and as a result, a high-quality screen image can be implemented.

Figure 5:
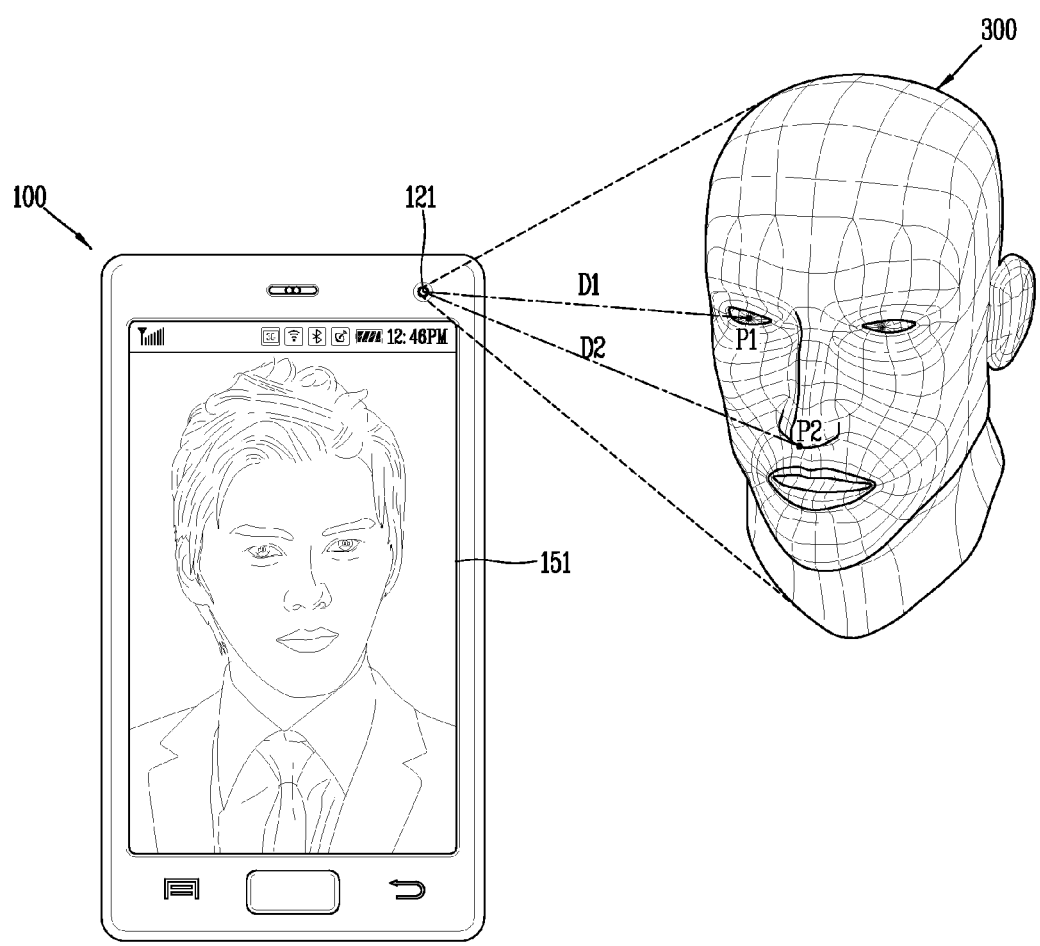
FIG. 5 is a conceptual view illustrating an example in which a subject is photographed using the mobile terminal according to the exemplary embodiment.

FIG. 5 is a conceptual view illustrating an example in which a subject 300 is photographed using the mobile terminal 100 according to the exemplary embodiment.

Referring to FIG. 5, in a case where the subject 300, e.g., a person's face, is photographed by the photographing unit 121, the controller 180 may set a plurality of virtual coordinates on a surface of the subject 300.

The controller 180 may compute photographing distance information including a plurality of photographing distances respectively mapped to the plurality of coordinates. In this case, the plurality of photographing distances may have different values. For example, as shown in FIG. 5, the surface of the subject 300 is irregular, and hence the first photographing distance D1 between one coordinate P1 and the photographing unit 121 may have a different value from the second photographing distance D2 between another coordinate P2 and the photographing unit 121.

The controller 180 may control the display unit 151 to display, in real time, an image, e.g., a face image, corresponding to the subject 300 when the subject 300 is photographed. More specifically, when the subject 300 is photographed, a preview image for the face image is first displayed and then captured in response to a control command, thereby obtaining the face image.

Figure 6:
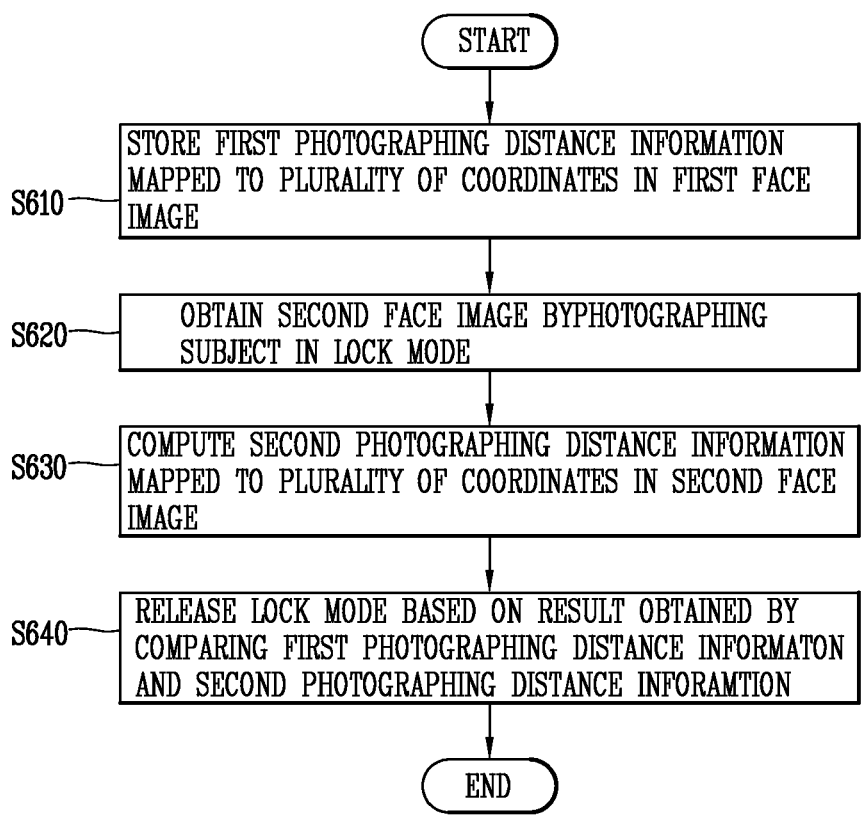
FIG. 6 is a flowchart illustrating a control method of the mobile terminal according to an exemplary embodiment.

FIG. 6 is a flowchart illustrating a control method of the mobile terminal 100 according to an exemplary embodiment.

Referring FIG. 6, first photographing distance information mapped to a plurality of coordinates in a previously obtained first face image is first stored as reference information for releasing the lock mode of the mobile terminal 100 (S610).

Next, if the face recognition function is performed in the lock mode, a second face image is obtained by photographing a subject (S620). Then, second photographing distance information mapped the plurality of coordinates is computed in the second face image (S630). Subsequently, the lock mode is released, based on a result obtained by comparing the first photographing distance information and the second photographing distance information (S640).

In the method of releasing the lock mode using the face recognition function according to the exemplary embodiment, the first face image and the first photographing distance information may be used as reference information for user authentication. The second face image and the second photographing distance information may be used as object information compared with the reference information. According to the degree of coincidence between the reference information and the object information, it may be decided whether the user authentication succeed in the lock mode. For example, if the degree of coincidence between the reference information and the object information is a predetermined reference value (e.g., 80%) or more, the lock mode may be released.

In the exemplary embodiment, the first and second face images may include front and side images of a face. Here, the front image refers to an image obtained by photographing the front of the face, and the side image refers to an image obtained by photographing a side rotated by an arbitrary angle in the horizontal direction from the front of the face.

If the front image is obtained as the second face image in the lock mode, the lock mode may be released according to a result obtained by comparing the photographing distance information of the obtained front image with the photographing distance information of a front image previously stored as the first face image. If the side image is obtained as the second face image in the lock mode, the lock mode may be released according to a result obtained by comparing the photographing distance information of the obtained side image with the photographing distance information of a side image previously stored as the first face image. If both the front and side images are obtained as the second face image in the lock mode, the lock mode may be released according to a result obtained by comparing the photographing distance information of the obtained front and side images with the photographing distance information of front and side images previously stored as the first face image.

As described above, in the exemplary embodiment, the lock mode of the mobile terminal 100 can be released, based on the photographing distance information that is linked with the face image and reflects the stereoscopic shape of the subject. As a result, although a person having no authority to use the mobile terminal 100 steals a photograph of a person having the authority to use the mobile terminal 100, the lock mode cannot be released using the photograph having no stereoscopic shape. This means that security can be reinforced as compared with the releasing of the lock mode based on only a planar face image.

In the exemplary embodiment, the lock mode may be released through partial comparison between the first and second face images. First, the controller 180 may extract first and second face portions corresponding to each other from the first and second face images. For example, a face portion such as an eye, nose or mouth may be extracted from each of the first and second face images. Next, the controller 180 may release the lock mode according to a result obtained by comparing a photographing distance mapped to the coordinate of the first face portion with a photographing distance mapped to the coordinate of the second face portion. As such, data related to a characteristic portion of the face are extracted and compared, thereby improving the accuracy of user authentication can be improved in the releasing of the lock mode.

Figure 7A:
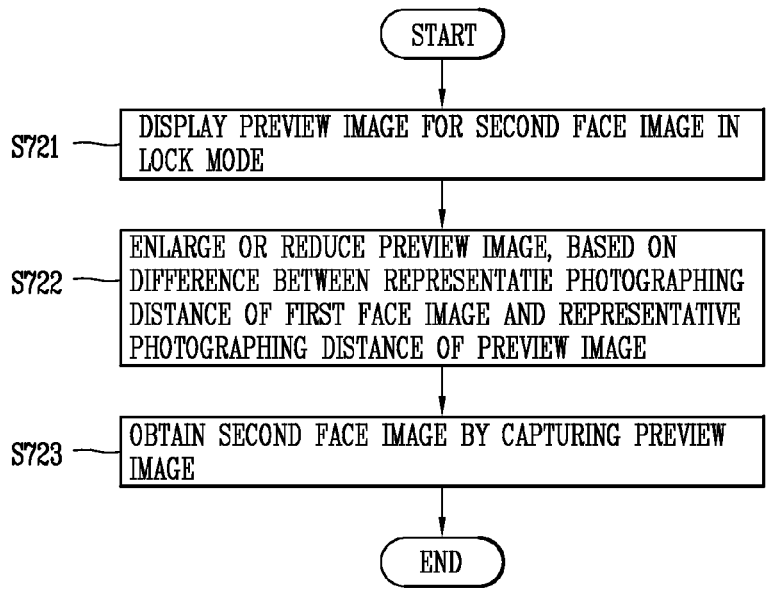
FIGS. 7A and 7B are flowcharts more specifically illustrating the obtaining of a second face image in FIG. 6.
Figure 7B:
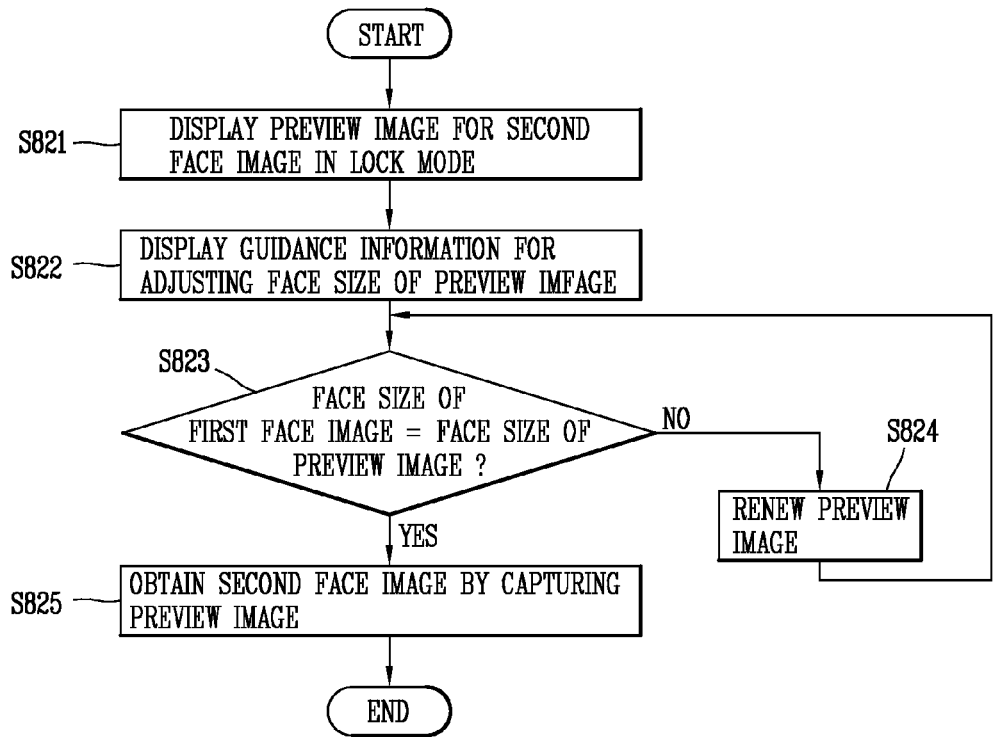

FIGS. 7A and 7B are flowcharts more specifically illustrating the obtaining of a second face image (S620) in FIG. 6.

Referring to FIG. 7A, when the subject is photographed in the lock mode, a preview image for the second face image is first displayed (S721). Subsequently, the preview image is enlarged or reduced, based on the difference between a representative photographing distance of the first face image and a representative photographing distance of the preview image (S722).

Here, the representative photographing distance refers to any one that represents a plurality of photographing distances between the plurality of coordinates of the surface of the subject and the photographing unit 121. The representative photographing distance may be used to compare images obtained in different photographing states. For example, at least one of images to be compared may be enlarged or reduced, based on the representative photographing distance, so that the comparison references between different images correspond to each other.

The representative photographing distance may be implemented in various forms. For example, the representative photographing distance may be a minimum or maximum value of the plurality of photographing distances. Alternatively, the representative photographing distance may be an average value of the plurality of photographing distances.

Next, the second face image is obtained by capturing the enlarged or reduced preview image (S723).

As such, in the releasing of the lock mode using the face recognition function, the size of an image can be automatically controlled so that data related to the currently photographed face image is compared with the data related to the previously stored face image, based on the same reference.

In the exemplary embodiment, if the face image corresponding to the preview image is the front image (side image), the preview image may be renewed so that the front image (side image) is obtained and the side image (front image) is then obtained. To this end, the photographing unit 121 may be controlled to photograph the side (front) of the subject (person's face), or the side image (front image) may be predicted from the front image (side image), using a rendering or modeling technique. This can be applied to the obtaining of the first and second face images.

Referring to FIG. 7B, as described with reference to FIG. 7A, when the subject is photographed in the lock mode, a preview image for the second face image is first displayed (S821). Subsequently, guidance information for adjusting the face size of the preview image is displayed (S822). The guidance information may include a graphic objective or text-type guidance phrase for guiding a preferable face size. This will be described in detail with reference to FIGS. 8A and 8B.

Next, the face size of the first face image is compared with the face size of the preview image (S822). In a case where the compared face sizes do not correspond to each other, the preview image is renewed (S824). After the preview image is renewed (S824), the comparing of the face sizes (S822) may be repetitively performed.

In this case, a user may move closer to the photographing unit 121 or move far away from the photographing unit 121. Therefore, the photographing distance from a subject (e.g., a user's face) may be adjusted. Alternatively, the user may input a control command for performing a zoom function. Accordingly, the focusing distance from the subject can be adjusted. This means that when the lock mode is released using the face recognition function, the image size can be manually controlled so that the data related to the currently photographed face image is compared with the data related to the previously stored face image, based on the same reference.

In a case where the compared face sizes correspond to each other, the second face image is obtained by capturing the preview image (S825).

In the exemplary embodiment, if the face image corresponding to the preview image is the front image (side image), guidance information for guiding a face surface to be photographed may be displayed so that the front image (side image) is obtained and the side image (front image) is then obtained. For example, if the front image is obtained, a guidance phrase for requesting the user to photograph the side of the user's face may be displayed so that the side image can be obtained.

The preview image may be captured in consideration of person's eye flickering. For example, the face image in the state in which person's eyes are close is disregarded, and the face image in the state in which the person's eyes are open may be captured as a valid image.

Figure 8A:
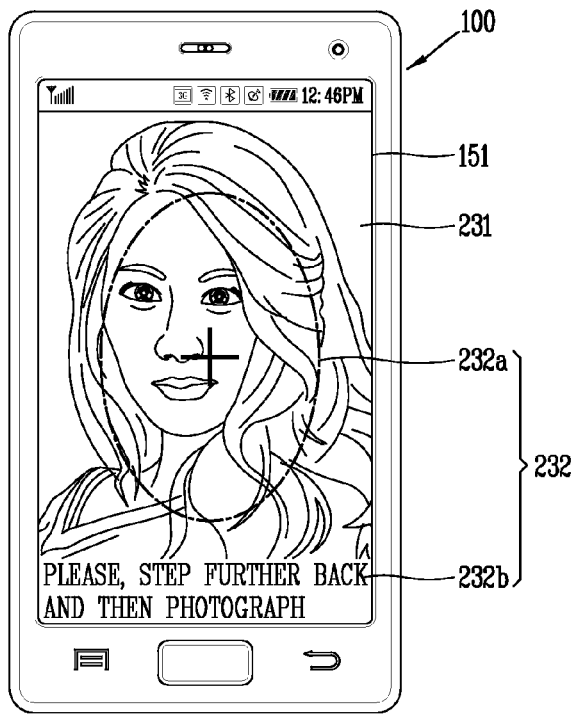
FIGS. 8A and 8B are conceptual views illustrating a user interface of the mobile terminal, related to the obtaining of a face image according to an exemplary embodiment.
Figure 8B:
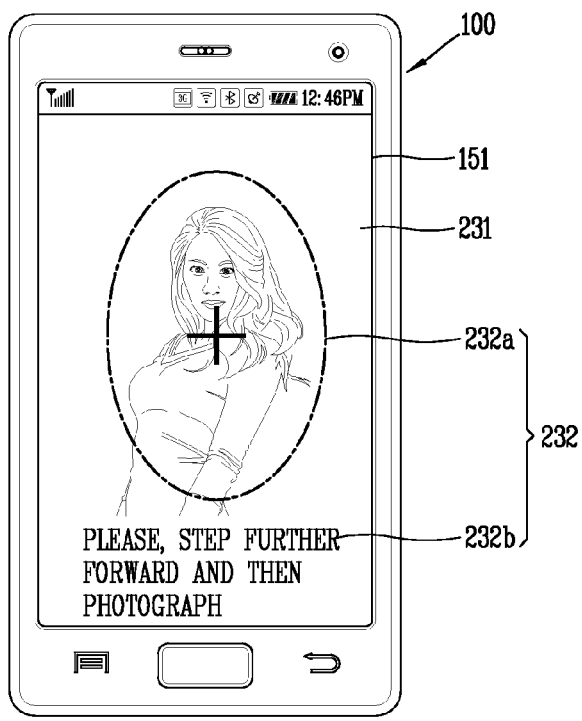

FIGS. 8A and 8B are conceptual views illustrating a user interface of the mobile terminal 100, related to the obtaining of a face image according to an exemplary embodiment.

Referring to FIGS. 8A and 8B, the controller 180 may control the display unit 151 to display a preview image 231 for the second face image when the subject is photographed in the lock mode. The user can confirm with which size the user's face is being photographed through the preview image 231.

The preview image 231 may be automatically or manually enlarged or reduced before being captured so that the second face image obtained in the lock mode is compared with the previously stored first face image, based on the same reference.

The controller 180 may control the display unit 151 to display guidance information 232 for informing the user of a change in size of the preview image 231 in the lock mode. The guidance information 232 may include a graphic objective 232a for informing the user of the face size of the first face image and a text phrase 232b for informing the user to adjust the photographing distance. The phrase "Please, step further back and then photograph" as shown in FIG. 8A or the phrase "Please, step further forward and then photograph" as shown in FIG. 8B may be displayed as an example of the text phrase 232b.

The user confirms the guidance information 232, and accordingly, may adjust the distance between the user's face and the photographing unit 121 or input a control command so that the zoom function is performed. As a result, if the face size of the preview image 231 corresponds to that of the first face image, the controller 180 may control the photographing unit 121 so that the second face image is obtained by capturing the preview image 231. Here, the correspondence of the face size of the preview image 231 to that of the first face image means that the face size of the preview image 231 corresponds to the size of the graphic objective 232a for informing the user of the face size of the first face image.

FIG. 9 is a flowchart illustrating the control method of the mobile terminal 100, related to the changing of a lock releasing method according to an exemplary embodiment.

Referring to FIG. 9, an attempt for releasing the lock mode is first performed according to the lock mode releasing method using the face recognition function (S910).

Next, it is decided whether the releasing of the lock mode fails (S920). If the releasing of the lock mode fails, a screen image for releasing the lock mode using another lock mode releasing method is displayed (S930). In other words, another lock mode releasing method may be provided to substitute for the lock mode releasing method using the face recognition function. Accordingly, although a face recognition error occurs due to a change in user's face, caused by a scar, plastic surgery, etc., the lock mode can be released through an alternate means.

Figure 10A:
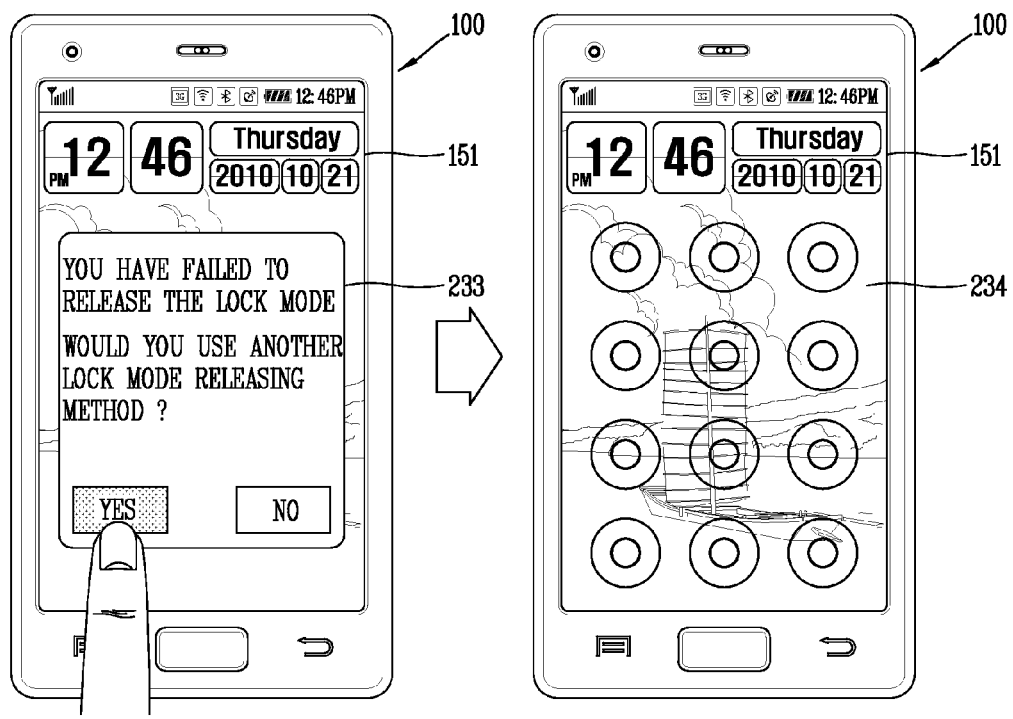
FIGS. 10A and 10B are conceptual views illustrating a user interface of the mobile terminal, related to the changing of the lock releasing method according to an exemplary embodiment.
Figure 10B:
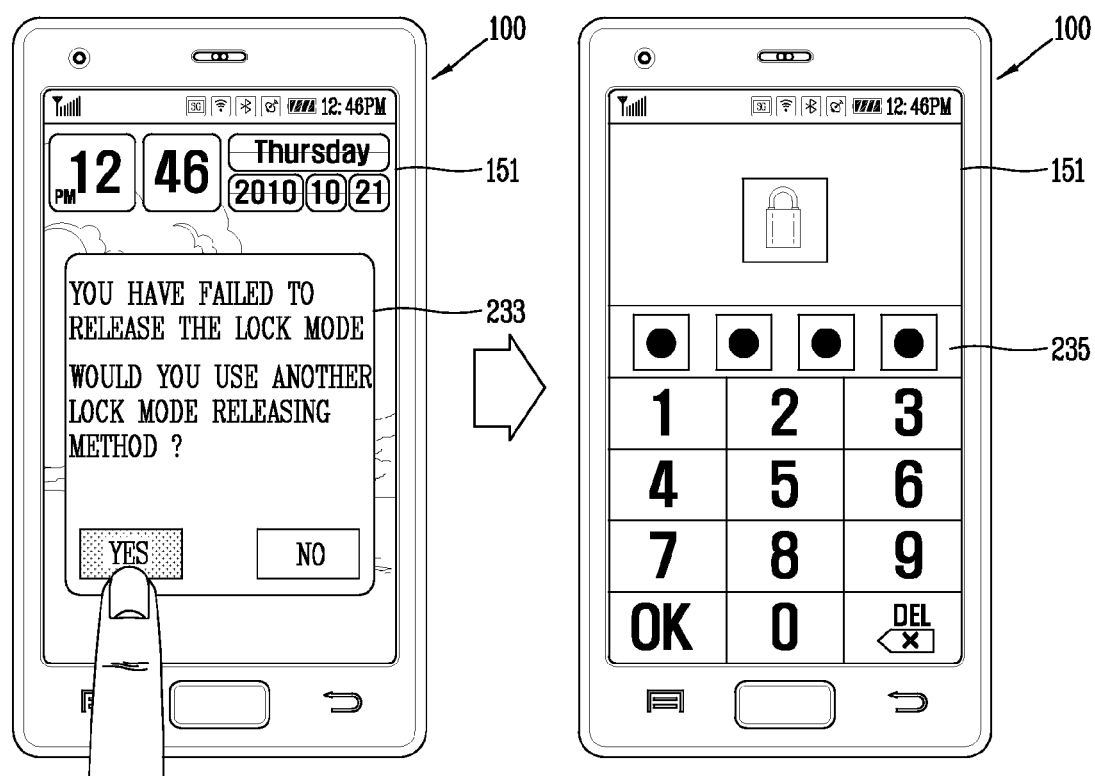

FIGS. 10A and 10B are conceptual views illustrating a user interface of the mobile terminal 100, related to the changing of the lock releasing method according to an exemplary embodiment.

Referring to FIGS. 10A and 10B, if the releasing of the lock mode using the face recognition function fails, the controller 180 may control the display unit 151 to inform the user that the releasing of the lock mode has failed and to display menu information 233 for selecting whether to release the lock mode using another lock mode releasing method.

The controller 180 may control the display unit 151 to display a screen image for releasing the lock mode according to another lock mode releasing method, in response to a touch input from the menu information 233. For example, as shown in FIG. 10A, a screen image 234 for releasing the lock mode using a pattern recognition function may be displayed. Alternatively, as shown in FIG. 10B, a screen image 235 for releasing the lock mode using a password recognition function may be displayed.

In the exemplary embodiment, it may be determined whether the face recognition function for releasing the lock mode is performed according to an external environment. For example, it may be determined whether the face recognition function is performed, based on at least one of the external brightness sensed by the illumination sensor 142 or the presence of proximity of an external object, sensed by the proximity sensor 143.

If it is sensed that the external environment is dark to a degree which cannot photograph the subject or that the user's body approaches the photographing unit 121, the controller 180 may not perform the face recognition function in the lock mode. The controller 180 may control the display unit 151 to display a screen image for releasing the lock mode according to another lock mode releasing method using the pattern recognition function, the password recognition function, etc.

Figure 11:
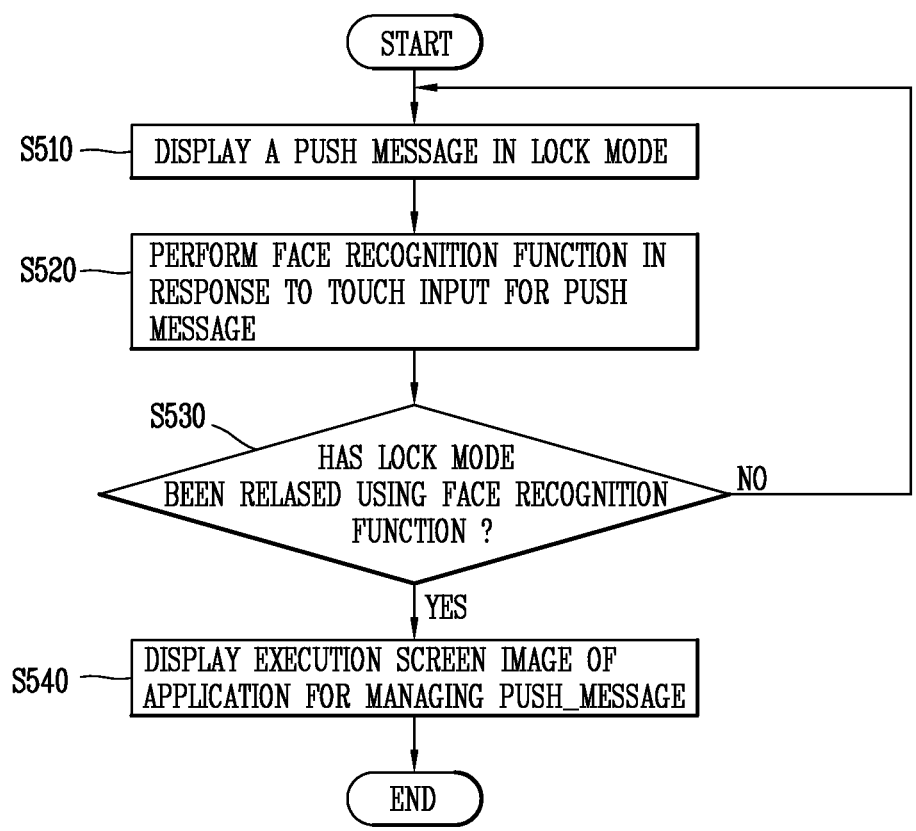
FIG. 11 is a flowchart illustrating the control method of the mobile terminal, related to the identifying of a push message according to an exemplary embodiment.

FIG. 11 is a flowchart illustrating the control method of the mobile terminal 100, related to the identifying of a push message according to an exemplary embodiment.

Referring to FIG. 11, a push message is first displayed in the lock mode (S510). In this case, the entire content of the push message is not open to the public, but a partial content of the push message may be open to the public.

Next, the face recognition function is performed in response to a touch input for the push message (S520).

Subsequently, it is decided whether the lock mode is released using the face recognition function (S530). In a case where the lock mode is released, an execution screen image of an application (e.g., a messenger application) for managing the push message is displayed (S540).

Figure 12:
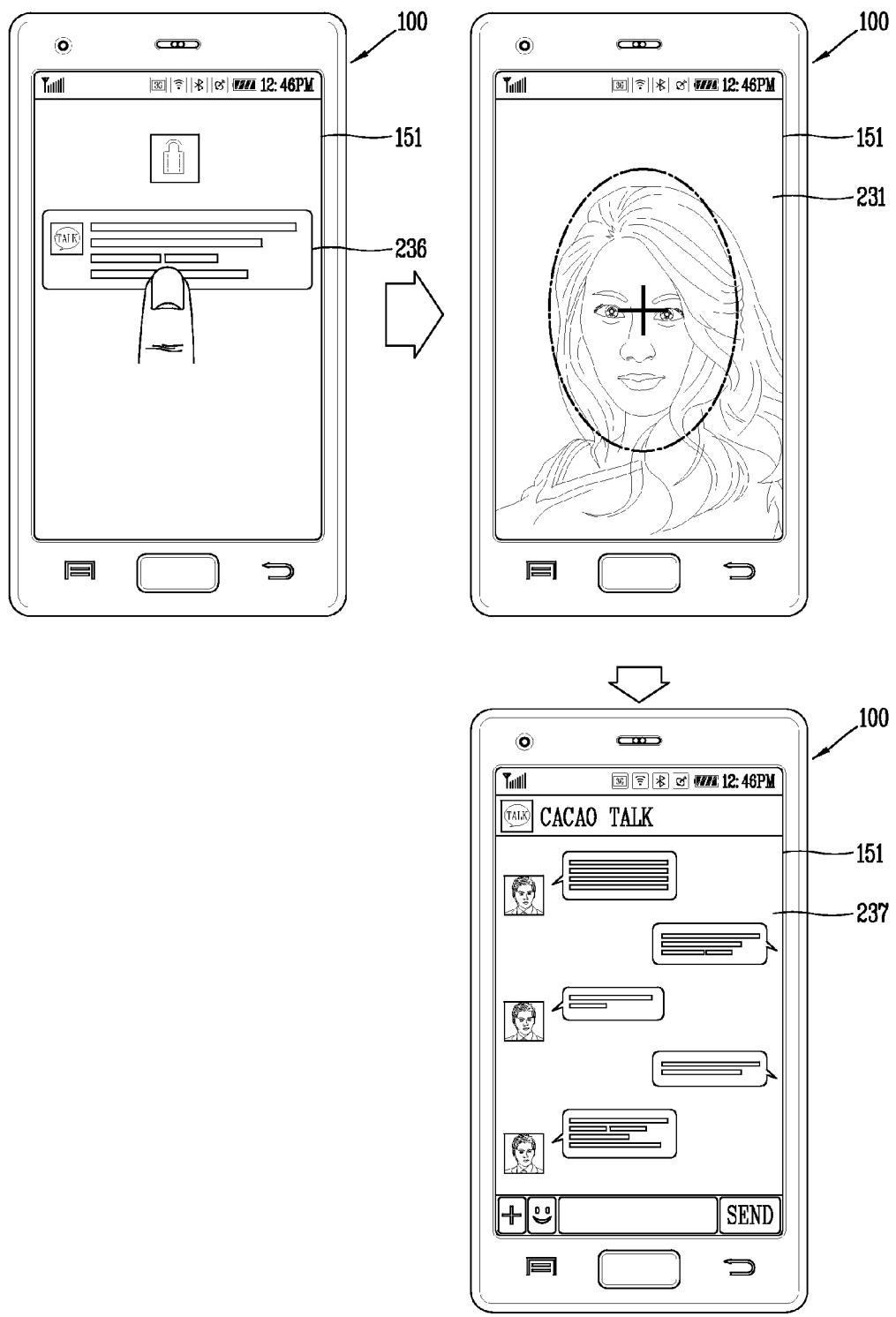
FIG. 12 is a conceptual view illustrating a user interface of the mobile terminal, related to the identifying of the push message according to an exemplary embodiment.

FIG. 12 is a conceptual view illustrating a user interface of the mobile terminal 100, related to the identifying of the push message according to an exemplary embodiment.

Referring to FIG. 12, the controller 180 may control the display unit 151 to display a push message 236 in the lock mode.

The controller 180 may perform the face recognition function in response to a touch input for the push message 236. In this case, the controller 180 may control the display unit 151 to display a preview image 231 for releasing the lock mode using the face recognition function.

As described above, if the lock mode is released, based on a result obtained by comparing the first photographing distance information and the second photographing distance information, respectively corresponding to the first face image and the second face image, the controller 180 may control the display unit 151 to display an execution screen image 237 of an application for managing the push message 236.

Accordingly, the user authentication is not requested when the push message 236 is displayed in the lock mode, thereby implementing the user interface so that the user can quickly confirm the content of the message. Further, in a case where the messenger application is executed so that user can fully confirm the content of the message or can have conversations with someone who sent the push message, the user authentication is requested, thereby reinforcing security.

According to exemplary embodiments, the aforementioned methods can be embodied as computer readable codes on a computer-readable recording medium. Examples of the computer readable recording medium include a ROM, RAM, CD-ROM, magnetic tapes, floppy disks, optical data storage devices, and carrier waves (such as data transmission through the Internet).

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a photographing unit configured to obtain images;
    a display unit configured to display information;
    an illumination sensor configured to sense external brightness;
    a proximity sensor configured to sense proximity of an external object;
    a memory configured to store first photographing distance information mapped to a previously obtained first face image, the first photographing distance information including photographing distances between the photographing unit and each of a plurality of coordinates defined on a surface of a subject in the first face image; and
    a controller configured to:
        control the display unit to display partial content of a push message in a lock mode in which an entire content of the push message is not available publicly;
        detect a touch input applied to the displayed partial content of the push message;
        determine whether to execute a face recognition function or another function to release the lock mode based on at least the sensed external brightness and the sensed proximity of the external object;
        perform the selected function to release the lock mode; and
        control the display unit to display an execution screen of an application for managing the push message when the lock mode is released,
    wherein executing the face recognition function comprises:
        controlling the display unit to display a preview image obtained by the photographing unit;
        obtaining a second face image from the preview image; and
        releasing the lock mode based on a comparison of the first photographing distance information to second photographing distance information that includes photographing distances between the photographing unit and each of a plurality of coordinates defined on a surface of a subject in the second face image, and
    wherein performing the another function comprises:
        controlling the display unit to display an image for releasing the lock mode; and
        releasing the lock mode based on a touch input applied to the displayed image.

2. The mobile terminal of claim 1, wherein performing the face recognition function further comprises releasing the lock mode if a degree of coincidence between the first photographing distance information and the second photographing distance information is greater than or equal to a reference value.

3. The mobile terminal of claim 1, wherein performing the face recognition function further comprises:
    extracting a first face portion from the first face image and extracting a second face portion from the second face image, the first face portion corresponding to the second face portion; and releasing the lock mode based on a result of comparing a photographing distance mapped to one of the plurality of coordinates in the first face portion to a photographing distance mapped to one of the plurality of coordinates in the second face portion.

4. The mobile terminal of claim 1, wherein the controller is further configured to control the display unit to display a screen image for performing the another function for releasing the lock mode if it is determined not to release the lock mode as a result of performing the face recognition function.

5. The mobile terminal of claim 1, wherein the photographing unit comprises a camera array having a plurality of lenses and is configured to recognize the photographing distances between the photographing unit and each of the plurality of coordinates defined on the surface of the subject in the second face image.

6. The mobile terminal of claim 1, wherein each of the first and second face images comprises at least a front or side image corresponding to a first face surface.

7. The mobile terminal of claim 6, wherein the controller is further configured to control the photographing unit to photograph a second face surface different than the first face surface in order to obtain the other of the front or side image when the front or side image is obtained.

8. The mobile terminal of claim 6, wherein the controller is further configured to determine the other of the front or side image based on an obtained front or side image.

9. The mobile terminal of claim 6, wherein the controller is further configured to control the display unit to display guidance information for photographing a second face surface different than the first face surface to which an obtained front or side image corresponds.

10. The mobile terminal of claim 1, wherein performing the face recognition function further comprises calculating the photographing distances between the photographing unit and each of the plurality of coordinates defined on the surface of the subject in the second face image.

11. The mobile terminal of claim 1, wherein performing the face recognition function further comprises obtaining the preview image as the second face image only if a person's eyes included in the preview image are open.

12. A control method of a mobile terminal, comprising:
storing first photographing distance information mapped to a previously obtained first face image as reference information for releasing a lock mode during which a touch input is restricted, the first photographing distance information including photographing distances between a photographing unit and each of a plurality of coordinates defined on a surface of a subject in the first face image;
displaying partial content of a push message in a lock mode in which an entire content of the push message is not available publicly;
detecting a touch input applied to the displayed partial content of the push message;
determining whether to execute a face recognition function or another function to release the lock mode based on at least external brightness sensed by an illumination sensor and proximity of an external object sensed by a proximity sensor;
performing the selected function to release the lock mode; and
displaying an execution screen of an application for managing the displayed partial content of the push message when the lock mode is released,
wherein executing the face recognition function comprises:
displaying a preview image obtained by the photographing unit;
obtaining a second face image from the preview image; and
releasing the lock mode based on a comparison of the first photographing distance information to second photographing distance information that includes photographing distances between the photographing unit and each of a plurality of coordinates defined on a surface of a subject in the second face image, and
wherein performing the another function comprises:
displaying an image for releasing the lock mode; and
releasing the lock mode based on a touch input applied to the displayed image.

13. The control method of claim 12, wherein performing the face recognition function further comprises releasing the lock mode if a degree of coincidence between the first photographing distance information and the second photographing distance information is greater than or equal to a reference value.

14. The control method of claim 12, wherein performing the face recognition function further comprises:
extracting a first face portion from the first face image and extracting a second face portion from the second face image, the first face portion corresponding to the second face portion; and
releasing the lock mode based on a result of comparing a photographing distance mapped to one of the plurality of coordinates in the first face portion to a photographing distance mapped to one of the plurality of coordinates in the second face portion.

15. The control method of claim 12, further comprising displaying a screen image for performing the another function for releasing the lock mode if it is determined not to release the lock mode as a result of performing the face recognition function.

16. The control method of claim 12, wherein performing the face recognition function further comprises:
calculating the photographing distances between the photographing unit and each of the plurality of coordinates defined on the surface of the subject in the second face image.

17. The control method of claim 12, wherein performing the face recognition function further comprises obtaining the preview image as the second face image only if eyes included in the preview image are open.

* * * * *